Sept. 10, 1935.  E. C. DAMROW  2,014,279
CURD RAKE
Filed March 18, 1935
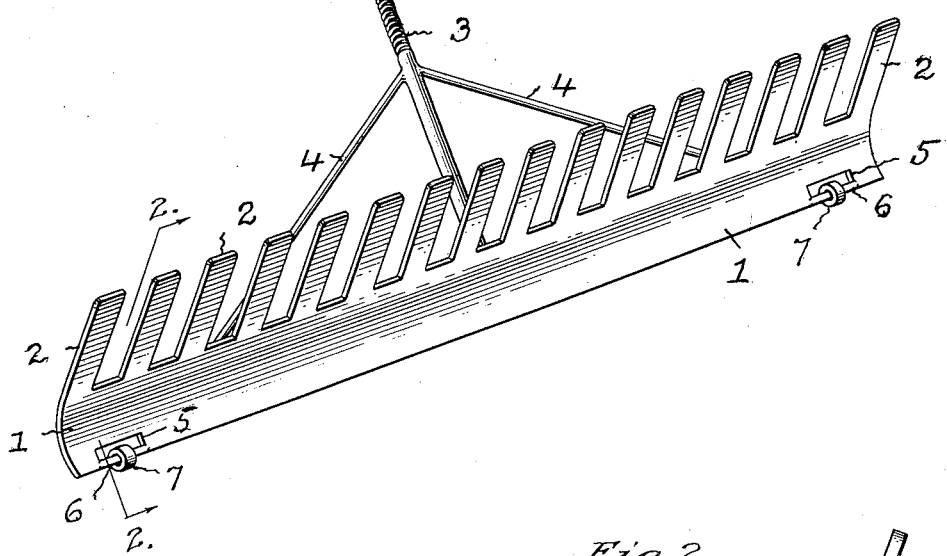
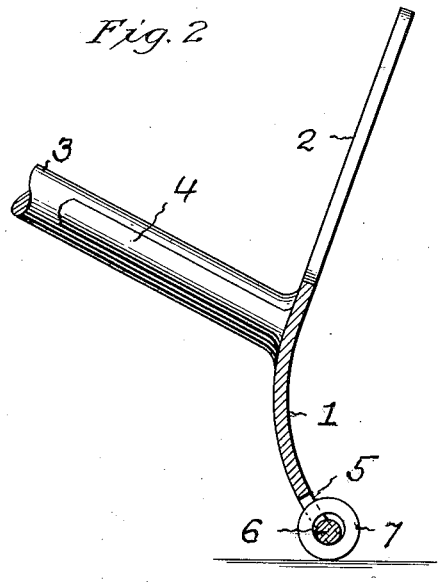
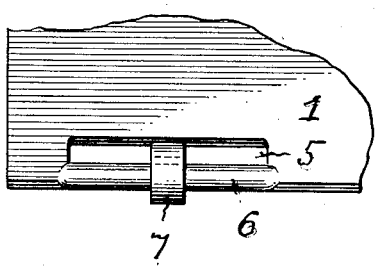
Inventor:
EDWARD C. DAMROW,
By Robert Burns,
Atty.

Patented Sept. 10, 1935

2,014,279

UNITED STATES PATENT OFFICE 2,014,279

CURD RAKE

Edward C. Damrow, Fond du Lac, Wis., assignor to Damrow Brothers Company, Fond du Lac, Wis., a corporation of Wisconsin Application March 18, 1935, Serial No. 11,649

3 Claims. (Cl. 31—46)

This invention relates to that type of curd rakes used in the cheese making industry which are formed of sheet metal protected by a coating of tin or like protecting material. And this improvement has for its object:

To provide a structural formation and combination of parts and features in a curd rake whereby a ready and effective action on the curd contents of its holding vat is attained under an easy and moderate manipulation of the rake by a workman, with an avoidance in a large degree of abrasion of the bottom wall of the curd vat. The construction also providing for ready and effective cleaning and sterilizing of parts after practical use, all as will hereinafter more fully appear.

In the accompanying drawing:

Fig. 1 is a perspective view of a curd rake embodying this invention in its preferred form.

Fig. 2 is a detail longitudinal section of same, on line 2—2 Fig. 1.

Fig. 3 is a detail elevation of a lower corner of the main body portion of the rake.

Like reference numerals indicate like parts in the different views.

In this improvement the main rake body is formed of plate metal, properly tinned or otherwise coated, and comprises lower forwardly curved imperforate plate portion and a slotted upper portion, with the slots thereof extending to the upper edge of the rake body to provide a plurality of tines or teeth in transverse spaced relation one to the other. An operating handle 3 for the rake is attached to the rear face of the main body portion 1 with the connection stiffened by inclined bracing rods 4, as usual in this class of tools.

A material feature of this improvement comprises the formation of slots 5 in the lower edge of the body portion 1 of the rake, in adjacent relation to the lower corner portion thereof, with the lower edges of said slots formed by transversely extending bearing rods 6 upon which are revolubly mounted rollers 7 which are adapted to ride on the bottom wall of the curd containing vat 1 to maintain the lower edge of the main portion 1 of the rake from rubbing or abrasive contact with the usual protecting coating of said bottom wall in the actual use of the rake.

In the preferred construction shown, the slots 5, above referred to, are of a much greater transverse extent than the transverse length of the revoluble rollers 7, with a view to lateral shifting of the rollers 7 on their rods 6 in the usual cleaning and sterilizing operation to which the curd rake is exposed after actual use.

Having thus fully described my invention, what I claim as new, is:—

1. A curd rake of the type described, comprising a main body of an imperforate sheet form and a forwardly curved shape, a plurality of integrally formed tines extending upwardly from said main body in transverse spaced relation, an operating handle fixed on the rear face of the main body, and means on the lower edge of the main body for preventing abrasive contact of its lower edge with the protecting coating of the bottom wall of the vat in which the rake is used.

2. In a curd rake as specified in claim 1, wherein said means for preventing abrasive action comprises revoluble rollers, carrying rods for said rollers fixedly secured in slots formed in the lower edge of the rake body.

3. In a curd rake as specified in claim 1, wherein said means for preventing abrasive action comprises revoluble rollers, carrying rods for said rollers fixedly secured in slots formed in the lower edge of the rake body, said slots and carrying rods having greater transverse extent than the transverse length of the rollers.

EDWARD C. DAMROW.